United States Patent [19]
Stark, Sr.

[11] Patent Number: 5,327,993
[45] Date of Patent: Jul. 12, 1994

[54] DEER STAND APPARATUS

[76] Inventor: Craige A. Stark, Sr., Rte. 6, Box 204, Beaumont, Tex. 77705

[21] Appl. No.: 929,121
[22] Filed: Aug. 13, 1992
[51] Int. Cl.$^5$ ............................................. A01M 31/02
[52] U.S. Cl. ................................... 182/179; 182/179; 135/901; 43/1
[58] Field of Search .................. 182/129, 179; 135/87, 135/101, 106, 901; 43/1; 52/73

[56] References Cited

U.S. PATENT DOCUMENTS

| | | | |
|---|---|---|---|
| 2,854,705 | 10/1958 | McClaran | 135/901 X |
| 2,953,145 | 9/1980 | Moss et al. | 135/901 X |
| 3,220,766 | 11/1965 | Kates | 135/901 X |
| 3,289,787 | 12/1966 | McSwain | 182/20 |
| 4,606,142 | 8/1986 | Reneau | 43/1 |

FOREIGN PATENT DOCUMENTS

| | | | |
|---|---|---|---|
| 739282 | 10/1955 | United Kingdom | 182/179 |
| 814221 | 6/1959 | United Kingdom | 182/179 |

Primary Examiner—Alvin C. Chin-Shue

[57] ABSTRACT

A deer stand apparatus includes a plurality of spaced U-shaped frameworks arranged in a coextensive relationship relative to one another in a confronting relationship, having an elevated platform selectively securable thereon. The organization includes a shelter having a dome-shaped roof and a generally rectilinear body accessed through a gap within a plurality of adjacent mounting rods secured through the elevated platform. The organization is arranged for ease of disassembly for transport and storage thereof.

4 Claims, 5 Drawing Sheets

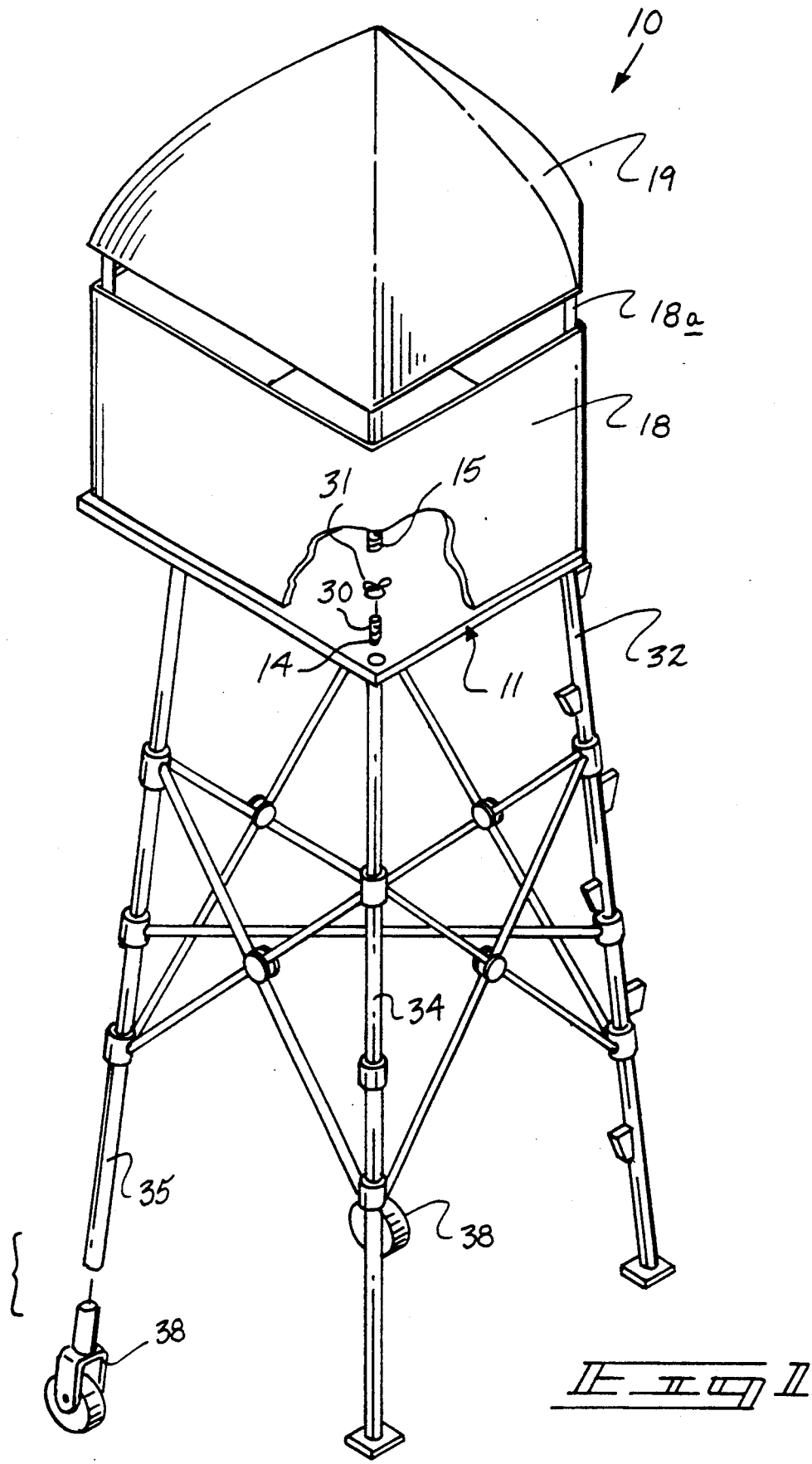

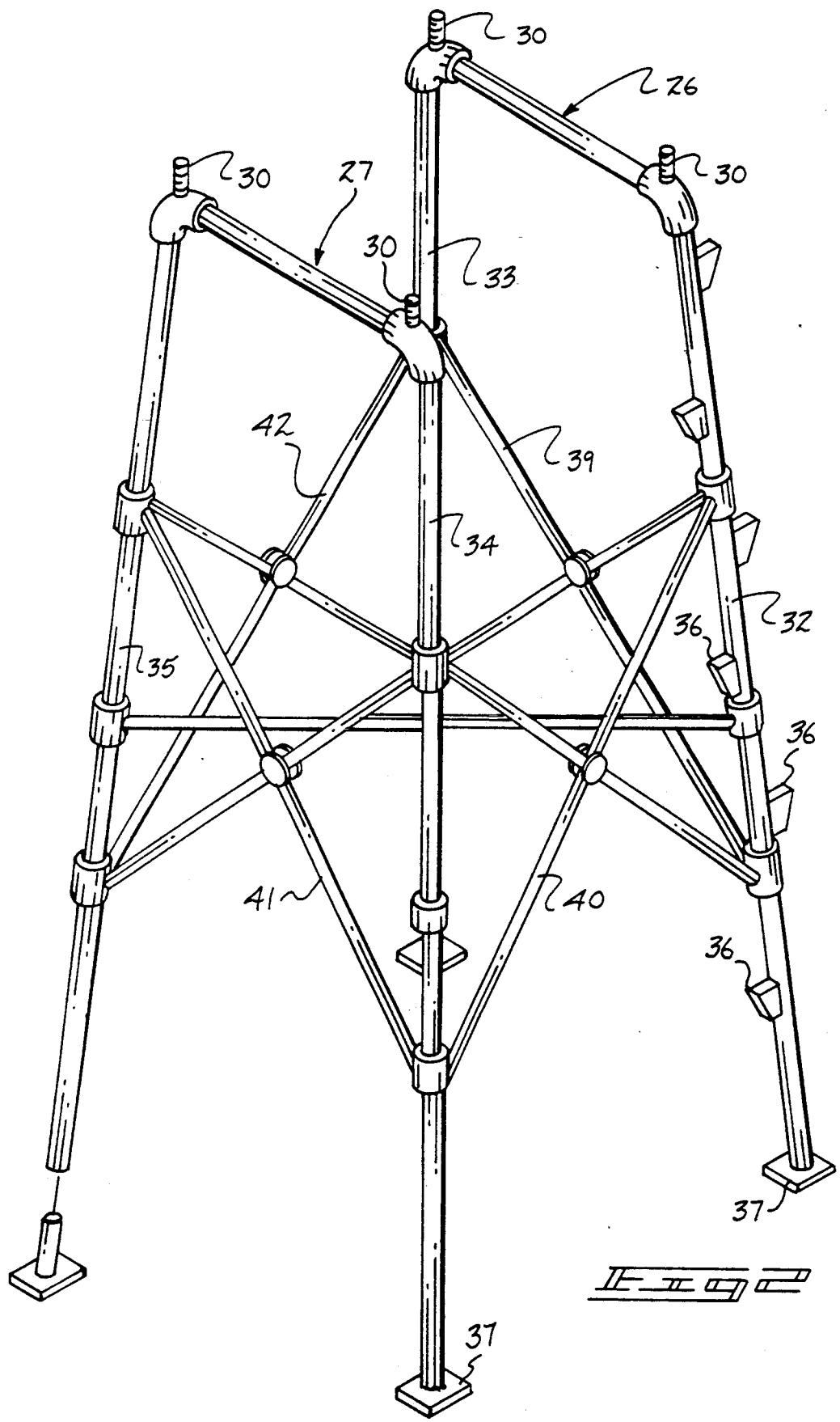

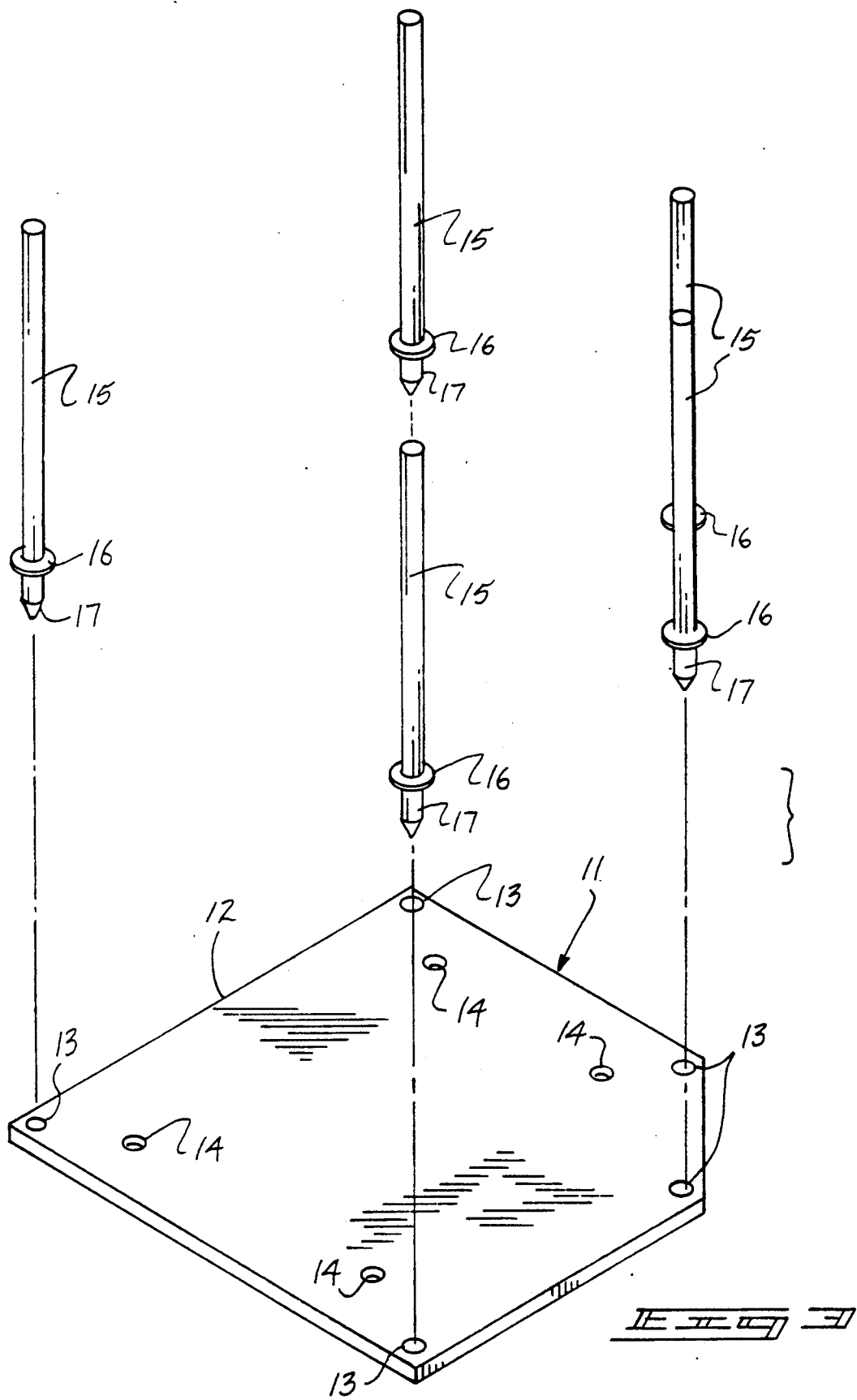

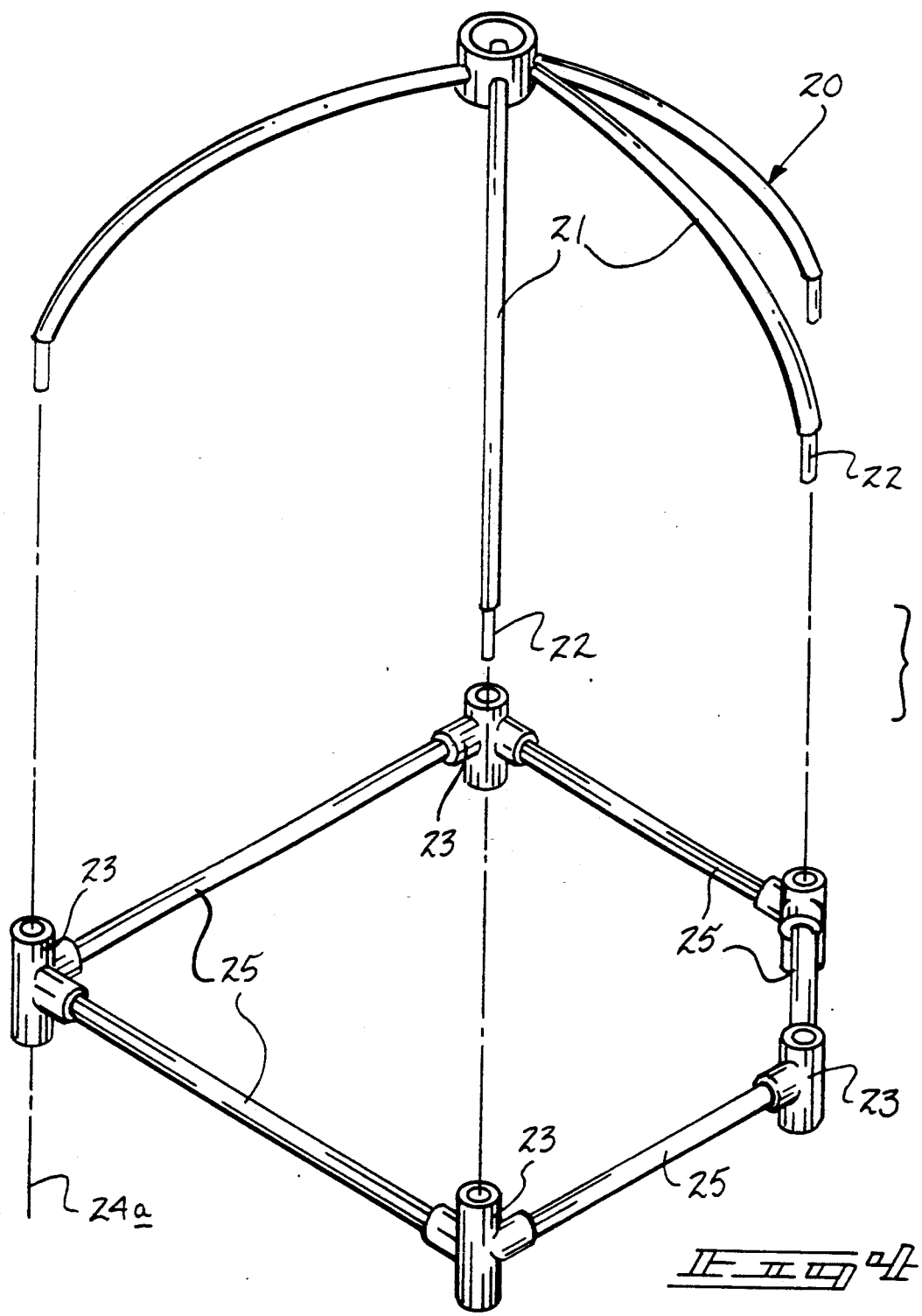

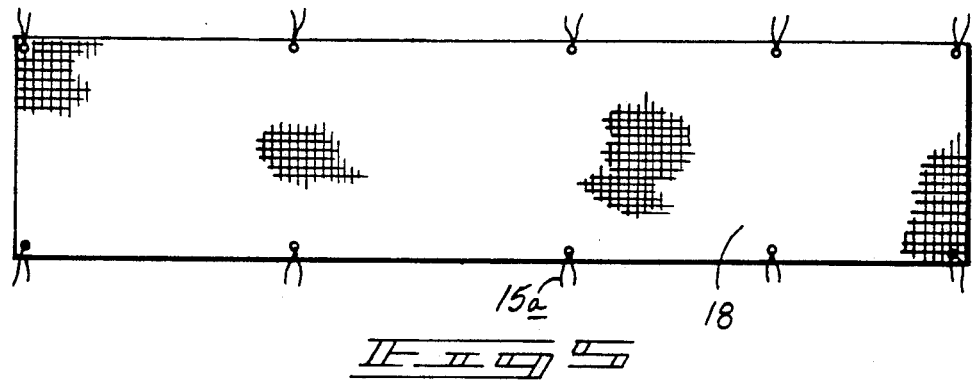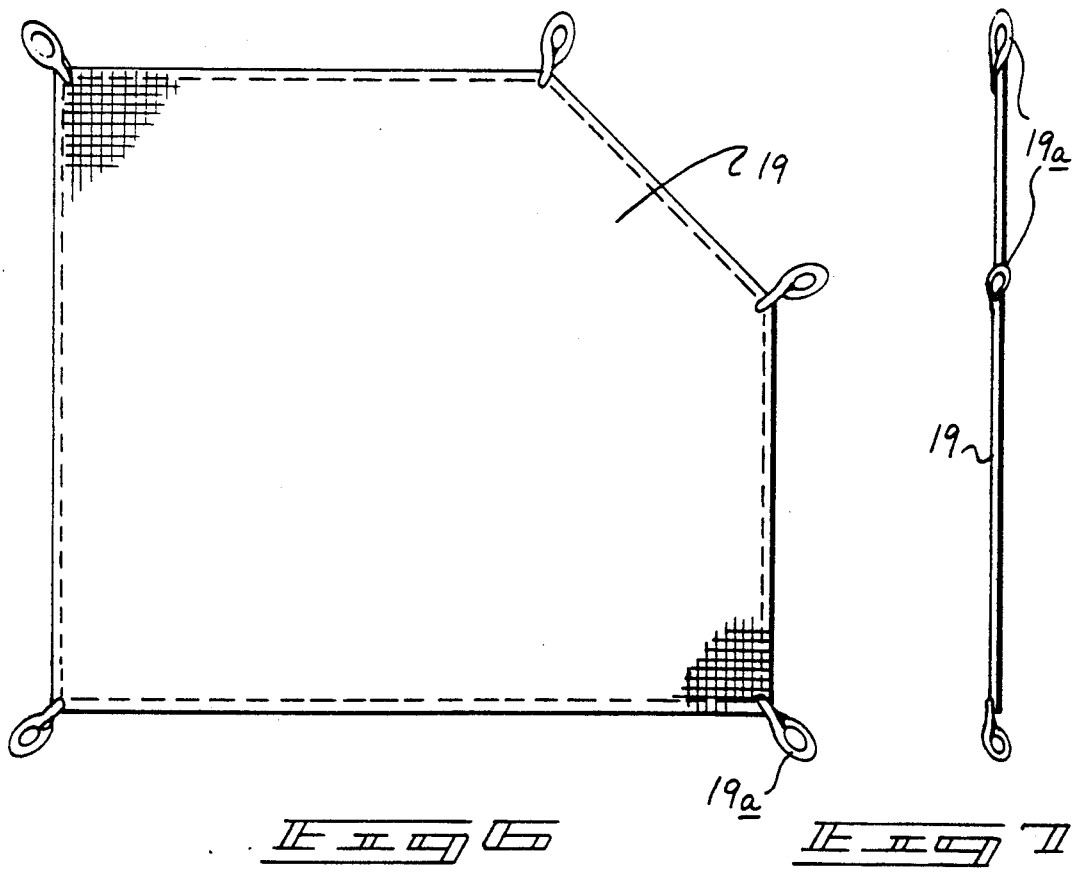

DEER STAND APPARATUS

BACKGROUND OF THE INVENTION

1. Field of the Invention

The field of invention relates to deer stand apparatus, and more particularly pertains to a new and improved deer stand apparatus wherein the same is arranged for ease of portability and disassembly.

2. Description of the Prior Art

Deer stands of various types have been utilized throughout the prior art and exemplified in the U.S. Pat. Nos. 4,552,247; 4,625,831; and 4,840,252.

The prior art has heretofore failed to provide for an organization having a shelter structure arranged for ease of disassembly and mounting relative to an elevated platform and transported upon a self-supporting framework to elevate the platform in use and in this respect, the present invention substantially fulfills this need.

SUMMARY OF THE INVENTION

In view of the foregoing disadvantages inherent in the known types of deer stand apparatus now present in the prior art, the present invention provides a deer stand apparatus wherein the same employs a framework including intersecting legs arranged relative to one another to permit ease of erection and disassembly of the organization in use. As such, the general purpose of the present invention, which will be described subsequently in greater detail, is to provide a new and improved deer stand apparatus which has all the advantages of the prior art deer stand apparatus and none of the disadvantages.

To attain this, the present invention provides a deer stand apparatus including a plurality of spaced U-shaped frameworks arranged in a coextensive relationship relative to one another in a confronting relationship, having an elevated platform selectively securable thereon. The organization includes a shelter having a dome-shaped roof and a generally rectilinear body accessed through a gap within a plurality of adjacent mounting rods secured through the elevated platform. The organization is arranged for ease of disassembly for transport and storage thereof.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved deer stand apparatus which has all the advantages of the prior art deer stand apparatus and none of the disadvantages.

It is another object of the present invention to provide a new and improved deer stand apparatus which may be easily and efficiently manufactured and marketed.

It is a further object of the present invention to provide a new and improved deer stand apparatus which is of a durable and reliable construction.

An even further object of the present invention is to provide a new and improved deer stand apparatus which is susceptible of a low cost of manufacture with regard to both materials and labor, and which accordingly is then susceptible of low prices of sale to the consuming public, thereby making such deer stand apparatus economically available to the buying public.

Still yet another object of the present invention is to provide a new and improved deer stand apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an isometric illustration of the support framework of the invention.

FIG. 3 is an isometric illustration of the support platform and associated mounting rods.

FIG. 4 is an isometric illustration of the dome supporting framework of the invention arranged for positioning upon the mounting rods.

FIG. 5 is an orthographic view of the fabric wall utilized by the invention.

FIG. 6 is an orthographic view of the canopy web utilized by the invention.

FIG. 7 is an orthographic side view of the canopy web.

DESCRIPTION OF THE PREFERRED EMBODIMENT

With reference now to the drawings, and in particular to FIGS. 1 to 7 thereof, a new and improved deer stand apparatus embodying the principles and concepts of the present invention and generally designated by the reference numeral 10 will be described.

More specifically, the deer stand apparatus 10 of the instant invention includes a platform 11 of a plate configuration, having a perimeter edge 12. A plurality of first apertures 13 are orthogonally directed through the platform plate 11 in a spaced relationship relative to one another in adjacency to the perimeter edge 12. A plurality of second apertures 14 are orthogonally directed through the platform plate 11 spaced from the first apertures 13 interiorly of the platform plate. A plurality of mounting rods 15 are provided, with an individual mounting rod orthogonally directed through each of the first apertures 13, with each of the mounting rods 15 having a lower portion 17 positioned below an abutment plate 16 orthogonally mounted to the mounting rod spaced from the lower terminal end of an associated mounting rod 15 to position an upper portion of each mounting rod 15 above the abutment plate 16. A fabric wall 18 is provided directed in surrounding relationship relative to the mounting rods 15, including fastener straps 15a positioned at upper and lower sides of the fabric web 18 (see FIG. 5) to secure the fabric wall 18 to the mounting rods 15. In this manner, plural pairs of fastener straps 15a are secured to each individual mounting rod 15 of said mounting rods 15. The fabric wall 18 is secured to provide for a door gap 18a that is defined between a plurality of adjacent mounting rods 15 at the discontinuous fabric wall 18 and permits access through the mounting wall interiorly of the fabric wall 18 for individual positioning upon the platform plate 11. The door gap 18a is positioned over a first frame front leg 32, in a manner to be discussed in more detail below, as the front leg 32 is arranged for orientation medially of the door gap 18a. A canopy 19 is provided of flexible construction formed of a plurality of canopy loops 19a (see FIGS. 6 and 7), as each of the canopy loops 19a are received on a respective mounting rod 15 adjacent an upper end thereof. A canopy framework 20 is provided (see FIG. 4), wherein the canopy framework 20 includes a plurality of canopy arcuate legs 21 having each a leg tip 22 received within an upper end of a framework leg socket tube 23 that in turn is received upon an upper end of an associated mounting rod 15. The socket tubes 23 are each formed about an axis 24a coaxially aligned with an associated leg tip 22. Socket tube frame legs 25 arranged in a coplanar relationship orthogonally intersect the axis 24 of each socket tube 23 to provide for a rigid framework to receive a canopy framework 20 thereon that is in turn received upon upper distal ends of the mounting rods 15, with the canopy 19 stretched overlying the canopy framework 20, in a manner as indicated in FIG. 1 for example.

A U-shaped first frame 26 extends coextensively relative to a U-shaped second frame 27, with the U-shaped first and second frames 26 and 27 respectively having respective first and second frame top legs 28 and 29 that are arranged in a parallel relationship relative to one another and positioned in contiguous underlying relationship relative to the platform plate 11 in a spaced relationship relative to one another. A pair of fastener rods 30 externally threaded are orthogonally mounted fixedly to each of the first and second frame top legs 28 and 29 extending upwardly of the top legs, with each of the fastener rods 30 received through an individual second aperture 14 of said plurality of second apertures 14. When thusly directed through an associated second aperture 14, a fastener nut 31 secured to an associated fastener rod 30 to secure the platform plate 11 relative to the first and second frames 26 and 27. The first frame includes a first frame front leg 32 spaced from a first frame rear leg 33 that is releasably mounted relative to the first frame top leg 28, with a second frame front leg 34 and a second frame rear leg 35 extending downwardly relative to the second frame top leg 29. A plurality of alternating step flanges 36 are fixedly mounted along the first frame front leg 32 that medially intersects the door gap 18a to permit access through the door gap as discussed above. If preferred, each of the front and rear legs of the first and second frames 26 and 27 are arranged for disassembly relative to one another utilizing socket fastener structure. The socket fastener structure is associated with respective first, second, third, and fourth "X" frames 39, 40, 41, and 42 that are provided. The first "X" frame 39 is positioned between the first frame front and rear legs 32 and 33, with the second "X" frame 40 positioned between the first frame front leg 32 and the second frame front leg 34. The third "X" frame 41 is positioned between the second frame front leg 34 and the second frame rear leg 35, with the fourth "X" frame 42 positioned between the first frame rear leg 33 and the second frame rear leg 35.

Mounting plates 37 are secured to lower terminal ends of each of the front and rear legs of each of the first and second frames 26 and 27. Alternatively, caster wheels 38 are slidably secured and releasably mounted to the lower terminal ends of the first frame rear leg 33 and the second frame rear leg 35 to permit ease of positioning of the apparatus 10 prior to its positioning in a desired orientation, whereupon the mounting plates 37 are reinserted and secured to the lower terminal ends of the legs 33 and 35.

As to the manner of usage and operation of the instant invention, the same should be apparent from the above disclosure and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A deer stand apparatus, comprising,
    a U-shaped first frame spaced from and parallel in confronting relationship relative to a U-shaped second frame, each arranged coextensive relative to one another, and a platform plate orthogonally mounted to the first frame and the second frame, and a fabric orthogonally secured about the platform plate extending upwardly thereof and selectively secured to the platform plate, and a canopy is arranged overlying the fabric wall, and the first frame includes a first frame top leg, and the second frame includes a second frame top leg, with the first frame top leg and the second frame top leg arranged in a parallel and coextensive relationship relative to one another, with the first frame including a first frame front leg, and a first frame rear leg extending below the first frame top leg, the second frame includes a second frame front leg and a second frame rear leg extending downwardly relative to the second frame top leg, and the first frame top leg and the second frame top leg each include a plurality of fastener rods fixedly and orthogonally mounted to the respective first frame top leg and the second frame top leg, the platform plate includes a perimeter edge, with a plurality of first apertures directed orthogonally through the platform plate in adjacency to the perimeter edge, and a plurality of second apertures directed orthogonally through the platform plate spaced from the first apertures directed interiorly of the platform plate, and each of said fastener rods is received through one of said second apertures, and an individual fastener nut is secured to each of said fastener rods above the platform plate, with the first frame top leg and the second frame top leg arranged below and in contiguous relationship relative to the platform plate, and a plurality of mounting rods are provided, with each of said mounting rods directed through one of said first apertures, and the fabric wall is secured to the mounting rods.

2. An apparatus as set forth in claim 1 wherein the fabric wall is discontinuous and a door gap is directed through said fabric wall between a plurality of said mounting rods, and the first frame front leg medially intersects the door gap, and the first frame front leg includes a plurality of step flanges fixedly mounted to the first frame front leg in alternating relationship relative to one another.

3. An apparatus as set forth in claim 2 wherein each mounting rod includes an abutment plate in abutment to the platform plate over the platform plate, with each mounting rod including a lower portion extending into one of said first apertures, and an upper portion extending above the platform plate, with the fabric wall mounted to the upper portion, the fabric wall including plural pairs of fastener straps, with each plural pair of fastener strap secured to an individual one of said mounting rods.

4. An apparatus as set forth in claim 3 including a canopy framework, the canopy framework including a plurality of arcuate legs, and each of the arcuate legs including a tip, and a plurality of socket tubes, with each socket tube having a socket tube axis, and each socket tube receiving one of said tips, and a socket tube frame leg orthogonally and integrally directed between a plurality of said socket tubes, with each socket tube received on each mounting rod upper portion, and the canopy including a plurality of canopy loops, and each canopy loop mounted to each mounting rod below a respective socket tube.

* * * * *